March 20, 1945.  C. B. STAIR  2,372,029
PNEUMATIC HAMMER
Filed Nov. 15, 1943  2 Sheets-Sheet 1

Inventor
Carlyle B. Stair
By Barnett & Truman
Attorneys

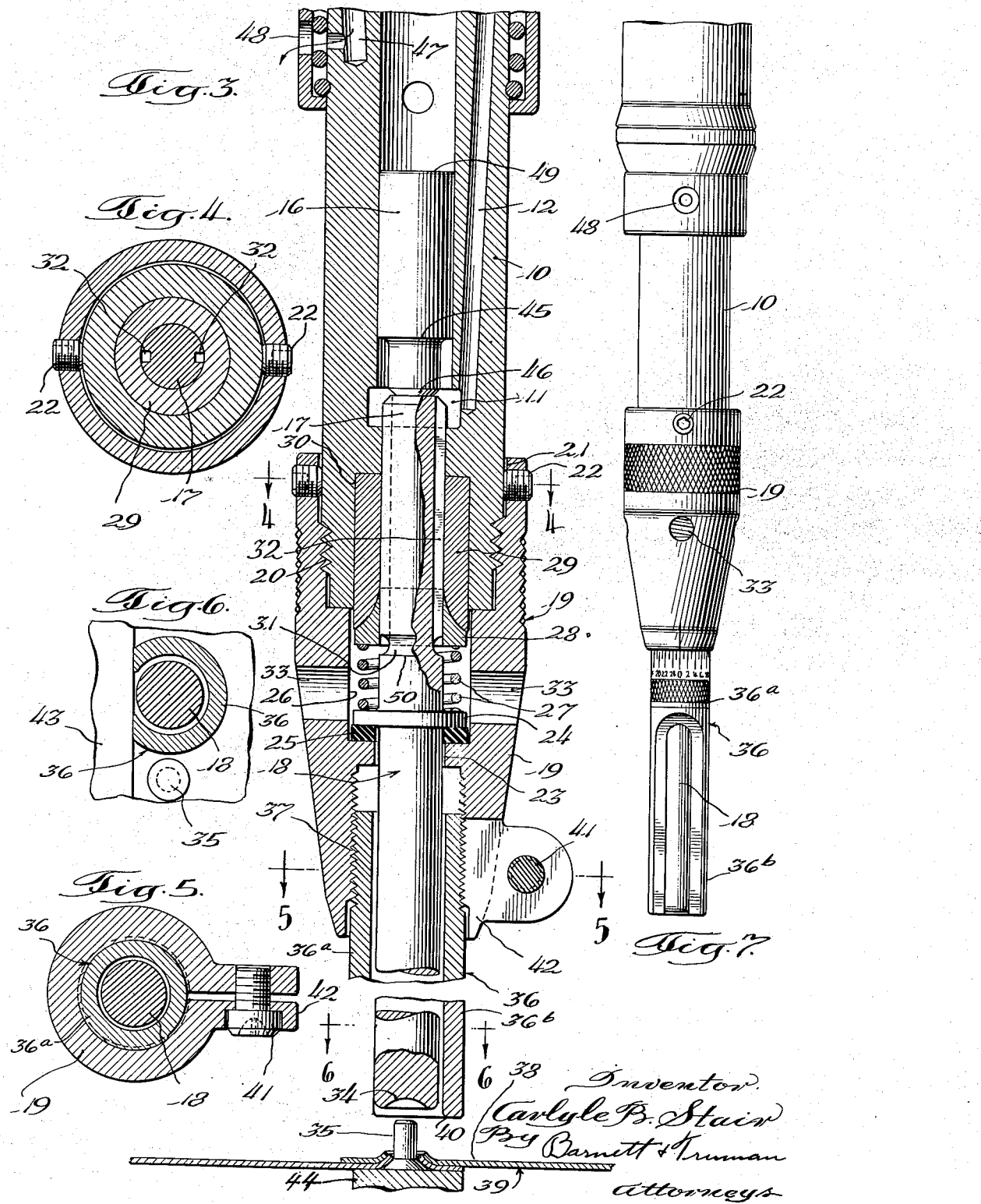

Patented Mar. 20, 1945

2,372,029

UNITED STATES PATENT OFFICE 2,372,029

PNEUMATIC HAMMER

Carlyle B. Stair, Downers Grove, Ill.

Application November 15, 1943, Serial No. 510,313

9 Claims. (Cl. 78—48)

This invention relates to certain new and useful improvements in devices suitable for use in riveting operations, for example, percussion hammers and rivet squeezers.

A principal object of the invention is to provide, in apparatus of the above character, improved constructions and appliances which function to prevent a rivet setting tool during formation of the rivet head from coming into contact with the plate or other object in which the rivet is being applied. In this way the invention avoids indenting or otherwise marring the surface of the plate adjacent the rivet head. When the principles of the invention are embodied in fluid pressure actuated devices, the invention contemplates the provision of means which operate automatically to render the fluid pressure within such device temporarily ineffective as an actuating force when the rivet setting tool of the device moves to a predetermined space position relative to the plane of the metal plate or other object in which the rivet is being applied.

Another object is to provide a simplified spacing element which may be readily and conveniently attached to the body of a pressure actuated riveter, for example, a portable pneumatic hammer, so that the rivet setting tool thereof is positively spaced a predetermined distance from the plate or other object in which a rivet is being applied. In this connection the invention also includes means whereby the space between the rivet set and the plate may be selectively varied as may be required for rivets of various sizes.

Further and more specific objects of the invention include the provision, in apparatus of the above character, of a spacing element which is so formed as to permit its use in situations where the rivets are arranged relatively close to each other or in close relation to shoulders or other obstructions on the plate. In addition to the spacing function of the spacing element, it also provides a simplified enclosure for the rivet setting tool and thereby prevents any likelihood of injury to the operator.

The invention, briefly described, comprises a body member, in the present instance a pneumatic hammer body, formed with the usual pressure chambers and other conventional means for alternatively directing air pressure against the opposite ends of a reciprocating plunger so as to move it into and out of percussive contact with the inner end of a rivet setting tool. In other instances, for example, in rivet squeezing apparatuses or in percussion tools operated by forces other than fluid pressure, other suitable means may be employed obviously for rendering the operating forces temporarily ineffective.

The rivet setting tool is supported in a suitable adapter so that the inner end of the tool extends into the barrel portion of the hammer body. It is held in its normal position of rest in said adapter by means of a resilient spring interposed between a portion of the tool and an abutment ring. The tool can be moved inwardly against the compression of the spring to various distances. During this movement, the curvature of the recessed end of the tool bears against the end of the rivet and, therefore, tends to bring the center of the tool into alignment with the center of the rivet. The extent of said inward movement is determined entirely by the length of the protruding end of the rivet and the amount of outward movement required of the tool to form the desired rivet head. When the tool is in its position of rest, air passages, preferably though not necessarily, form in the rivet setting tool per se, lead from a pressure chamber within the hammer body to exhaust ports formed in the adapter so as to exhaust the air pressure from the chamber into the atmosphere. It will be seen, therefore, that when the rivet setting tool is in its normal position of rest, the pressure chambers of the hammer are open to the atmosphere, and, therefore, the fluid pressure is made ineffective as an actuator. In order to close the said air passages and thereby make the pressure fluid effective as an actuator for the hammer, the rivet setting tool is moved inwardly a distance sufficient to move the outer ends of the air passages beneath said abutment ring and thereby close the said air passages. The normal rest position of the said tool is such as to support the reciprocating plunger clear of a normally restricted opening in the hammer body and, therefore, prevent the plunger from becoming wedged in said restricted opening.

In order to prevent the rivet setting tool from striking the surface of the plate adjacent the head of the rivet, a spacing element is secured to the adapter so as to extend a slight distance beyond the outer end of the rivet setting tool when the latter is in its position of rest. Consequently, when the spacing member is placed against the object in which the rivet is being applied, the rivet setting tool may move outwardly relative to the spacing member during the forming of the rivet head, but it can never move to the end of said spacing element. Consequently, it can never engage the surface of the plate or object adjacent the rivet head. In this way, all possibility of indenting or otherwise marring the smooth surface of a plate is avoided. In order to provide for variations in the spacing between the rivet setting tool and the plane of the plate in which the rivet is being applied, the said spacing member is made adjustable so that its effective length may be varied by turning the spacing element in an appropriate direction so as to screw it into or out of the said adapter.

It is, therefore, a specific object of this invention to provide a pneumatic hammer constructed and operating in the manner above briefly described, for carrying out the objects hereinabove mentioned, together with such other objects as will appear from the constructions herein more fully described in the following specification.

The invention is illustrated in one specific embodiment in the accompanying drawings wherein:

Fig. 3 is a longitudinal sectional view of a portion of the hammer device illustrated in Fig. 1, the same being shown on a larger scale and illustrating the positions of the parts when the rivet setting tool is in its normal position of rest.

Fig. 4 is a cross-sectional view taken on line 4—4 of Fig. 3.

Fig. 5 is a sectional view taken on line 5—5 of Fig. 3.

Fig. 6 is a cross-sectional view taken on line 6—6 of Fig. 3 and illustrating the position of the rivet setting tool and the surrounding guide member when the rivet is positioned in close relation to a shoulder or other obstruction on a plate; and Fig. 7 is a fragmentary view in elevation, and on a smaller scale than shown in the other figures, of the lower portion of the improved hammer device.

Figures 1, 2:
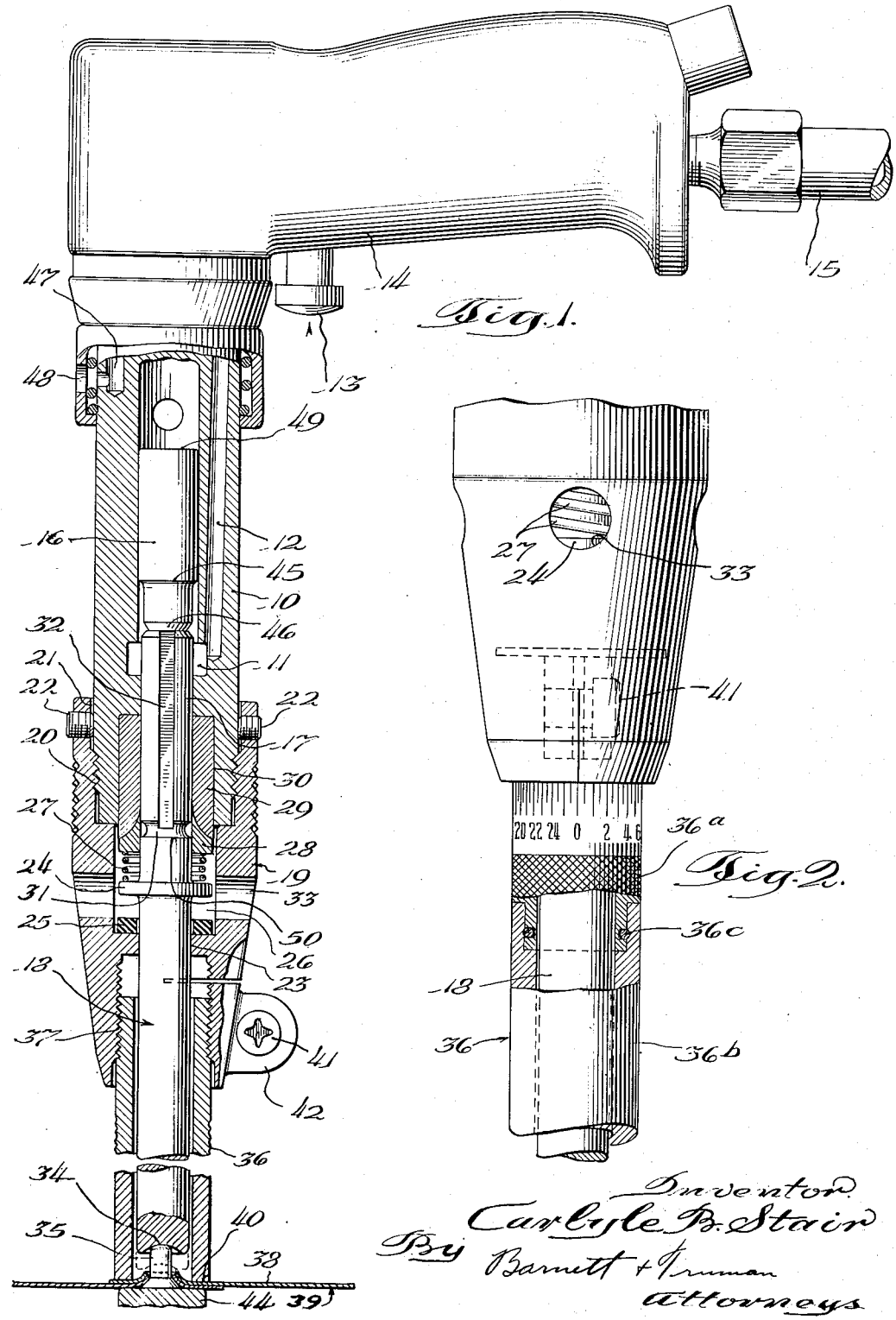
Fig. 1 is a longitudinal sectional view of a pneumatic hammer constructed in accordance with this invention.
Fig. 2 is a fragmentary view in elevation, illustrating certain details of construction and showing also a series of graduations for assisting the operator to make desired adjustments of one member relative to the other.

Referring to the drawings:

10 designates the body portion of a portable pneumatic hammer. 11 one of the air pressure chambers formed therein. 12 is an air passage leading from the chamber 11 to the source of pressure controlled by a throttle button 13 which projects outwardly from a hand grip 14. The fluid under pressure, for example, compressed air, is supplied by means of a conduit 15 leading from a source of supply (not shown) to a valve located within the hand grip 14 and controlled, in a manner well-known, by the operation of the throttle button 13 so as to direct fluid pressure alternately against opposite end faces of a plunger 16, so that the said plunger is forced into and out of percussive contact with the inner end 17 of a rivet setting tool 18. The rivet setting tool is supported in an adapter sleeve 19 which has a threaded engagement 20 with the outer portion of the hammer body 10. Preferably, the body receiving end of the adapter is counter-bored, as indicated at 21, so as to extend beyond and, therefore, conceal the threads 20. A series of safety set screws 22 (preferably four in number) extend through the counter-bored portion of the adapter and engage the hammer body so as to firmly lock the adapter on the body.

The rivet setting tool 18 extends through a central bore 23 in the adapter and is formed with an annular flange 24 which seats against a washer pad 25 positioned in the lower end of a cylindrical chamber 26 formed in the adapter 19. A coil spring 27 is interposed between the flange 24 of the rivet setting tool and an abutment 28 associated with the body portion of the hammer. The abutment 28 is in the form of a ring or sleeve slidably mounted on the upper end 17 of the rivet setting tool. The outer face of the abutment sleeve 28 is curved to fit the normally curved surface at the lower end of a cylindrical bearing member 29 inserted in a counter-bore 30 at the outer end of the hammer body. The said curved surface of the abutment fits snugly against the curved surface of the bearing member 29 so as to prevent any escape of air pressure at this point. The abutment ring 28 is used in the present embodiment because the invention, as herein constructed, is intended to be applied to a pneumatic hammer of conventional construction in which the outer end of bearing 29 is curved to fit a corresponding curvature of a tool ordinarily used in such hammers. However, when the improvements of the present invention are embodied in the hammer body per se, rather than in an adapter, the outer end of the hammer body can be made square and the abutment ring 28 can be omitted. The spring 27, it will be seen, normally exerts pressure against the flange 24 so as to hold it against the washer 25. In this position of the tool the upper end thereof extends through a restricted central passage in the hammer body a distance sufficient to prevent the plunger 16 from becoming wedged in the said restricted opening. Furthermore, when the tool is in its position of rest, as above indicated, an annular groove 31, formed in the upper end of the tool, extends partly beyond the square outer face of the abutment ring 28. This groove is connected by means of a plurality of ducts 32 to the pressure chamber 11. The ducts 32 are formed, preferably though not necessarily, in the upper end of the tool and provide passages whereby the fluid pressure may be exhausted. In this position of the tool, the pressure chamber 11 is open to the atmosphere. In such case, if the throttle button 13 is depressed to admit air under pressure into chamber 11, the air will escape to the atmosphere through ports 33. In order to make the air pressure effective for operation of the hammer, it is necessary to move the rivet setting tool 18 inwardly until the annular groove 31 is completely closed by the outer square edge of the abutment ring 28, for example, the position shown in Fig. 1. The said rivet setting tool may be moved inwardly to the desired position against the compression of the spring 27 by merely pressing its recessed end 34 against the end of the rivet 35 in the manner indicated in Fig. 1. The curvature of the recess, as before indicated, serves to center the tool 18 on the rivet.

In order to prevent the recessed end 34 of the rivet setting tool from engaging the surface of the plate or other object in which the rivet is being formed, a spacing sleeve member 36 is secured to the adapter sleeve. Preferably the spacer is made in two parts. The upper part 36$^a$ is threaded at 37 into the outer end portion of the adapter sleeve 19 so as to maintain a fixed position thereon. The lower end 36$^b$ is removably swiveled to the upper section 36$^a$ by means of an expanding ring member 36$^c$ positioned in an annular groove formed in the upper section so as to expand into frictional engagement with the adjacent portion of the lower member 36ᵇ. This engagement provides an impositive lock which permits the lower section 36ᵇ to be applied and removed when desired without disturbing the adjustment of the upper section. When the two sections of the spacing member are assembled and applied to the adapter, as shown, the adapter is maintained in a predetermined position relative to the face 38 of the plate 39. The upper section 36ᵃ of said spacer sleeve is preferably adjusted so that the outer end 40 of section 36ᵇ will extend a predetermined distance beyond the outer recessed end 34 of the rivet setting tool so that the said tool can never come into contact with the plane of the plate 39 during the formation of the head on the rivet 35. The spacing between the end 40 of the spacer sleeve and the end 34 of the rivet setting tool may be varied by merely rotating the sleeve 36 in an appropriate direction. In order to facilitate this adjustment, the inner end portion of the sleeve is provided with suitable graduations to indicate the extent of the adjustment. When the spacer 36 is properly adjusted, it is firmly locked in its adjusted position by turning the screw 41 in a direction to tighten the split collar portion 42 of the adapter about the inner threaded end portion of the spacer sleeve.

In order to permit the use of the spacer member in situations when the rivets are located relatively close to each other or when they are arranged in close relation to an obstruction, for example, a shoulder 43 (see Fig. 6), a portion of one side of the spacer sleeve 36 is cut away so that the rivet setting tool may be positioned relatively close to such abutment during the riveting operation.

In operation, the recessed outer end of the rivet setting tool is pressed against the end of a rivet 35, the rivet being held in place by a buck-up tool 44. The pressure exerted on the hammer moves the rivet setting tool inwardly from the position shown in Fig. 3 into the position indicated in Fig. 1, until the outer end 40 of the spacer sleeve 36 engages the face of sheet 38. This engagement between the spacer and the plate is, preferably though not necessarily, effected before beginning the head forming or riveting operation. In this position of the rivet setting tool the annular groove 31 is moved to a position within the central bore of the abutment ring 28 so that the air passages 32 leading to the pressure chamber 11 are closed. When the parts are in this position, fluid pressure admitted to the pressure chamber 11 exerts pressure against the shoulder portion 45 and outer face 46 of the plunger 16. Whereupon the plunger recedes from the tool 18 in a direction toward the hand grip end of the hammer. During the receding movement of the plunger 16, the air in front of the plunger is caused to exhaust through exhaust passage 47 and port 48. When the plunger is retracted to a suitable position, mechanism within the hammer, not shown, functions to direct the fluid pressure against the end 49 of the plunger so as to force it in a direction to strike the inner end 17 of the rivet setting tool. As soon as the tool has moved a distance sufficient to uncover the outer edge 50 of the annular groove 31, the fluid pressure within the chamber 11 is instantly dissipated. Instantaneous dissipation of pressure is insured since any slight movement of the edge 50 of the groove beyond the square outer face of the abutment sleeve 28 results in producing a relatively large exhaust opening. By the exhaust of the pressure fluid from the pressure chamber 11 in the manner above described, the fluid pressure is made ineffective to retract the plunger 16. The escape of the air produces a hissing sound which serves as an audible signal to indicate to the operator and to the person manipulating the bucking tool that the riveting operation is completed.

While the invention is illustrated herein in connection with fluid pressure riveters and specifically in connection with a pneumatic hammer, it will be readily understood by persons familiar with this art that the principles of the present invention may be readily embodied in riveters and similar percussion devices actuated by forces other than fluid pressure, the broad feature of the invention being, regardless of the specific device in which it is embodied, to limit the movement of a working tool relative to the work so that the effectiveness of the tool will be automatically discontinued when the desired work has been completed.

I claim:

1. A percussion riveter of the character described comprising a body member having a pressure chamber therein, a rivet setting tool for upsetting a rivet, means defining an exhaust passage from said pressure chamber to the atmosphere, means controlling the opening and closing of said passage and effective upon a predetermined movement of said tool to vent the pressure fluid from said chamber to the atmosphere, wherby said fluid is rendered ineffective as an actuator for said riveter, and an adjustable spacing means extending beyond the outer end of said rivet setting tool to prevent said tool from coming into contact with the member in which the rivet is applied.

2. A fluid pressure actuated device comprising a body member having a fluid pressure chamber therein, a rivet setting tool supported in said body for applying metal displacing pressure to a rivet, passages formed in said tool and leading from said chamber to the atmosphere, means effective upon predetermined movement of said tool in one direction for opening said passages and effective upon movement of the tool in the opposite direction to close said passages, and spacing means extending outwardly from the end of the tool for engagement with the object receiving the rivet adjacent the rivet head, whereby the rivet setting tool is prevented from engaging said object.

3. A fluid pressure actuated device having a fluid pressure chamber therein, a rivet setting tool operated in said body for applying metal displacing pressure to a rivet, passages formed in said tool and leading from said chamber to the atmosphere, means effective upon predetermined movement of said tool in one direction for opening said passages, and effective upon movement of the tool in the opposite direction to close said passages, and a spacing sleeve enclosing the said tool and adapted to be pressed against the object in which the rivet is being applied to hold the tool from contacting said object, the said sleeve being adjustably connected to a fixed part of the device whereby its effective length may be varied to change the distance between the said tool and the said object.

4. In a pneumatic hammer having a body formed with an air pressure chamber and a plunger for reciprocating in the chamber in response to air pressures exerted against opposite ends thereof, means for supporting a percussion transmitting tool to receive percussive force from said plunger, comprising an adapter removably attached to the outer end of said hammer body, a percussion transmitting tool slidably supported in said adapter with its inner end extending into said bore for engagement with said plunger, means for limiting the outward movement of the tool relative to said adapter, a spring for holding the tool in its outward position, a passage leading from said pressure chamber to the atmosphere, and means automatically effective when the tool is moved inwardly to close said passage whereby the air pressure is made effective for operating said plunger, and whereby the air pressure is made ineffective for the operation of said plunger when the tool is in its outermost position.

5. In a pneumatic hammer having a body formed with an air pressure chamber and a plunger for reciprocating in the chamber in response to air pressures exerted against opposite ends thereof, means for supporting a percussion transmitting tool to receive percussive force from said plunger, comprising an adapter removably attached to the outer end of said hammer body, a percussion transmitting tool slidably supported in said adapter with its inner end extending into said bore for engagement with said plunger, means for limiting the outward movement of the tool relative to said adapter, a spring for holding the tool in its outward position, a passage leading from said pressure chamber to the atmosphere, means automatically effective when the tool is moved inwardly to close said passage whereby the air pressure is made effective for operating said plunger, and whereby the air pressure is made ineffective for the operation of said plunger when the tool is in its outermost position, and spacing means adjustably fixed to the adapter for engaging an object so as to hold the outer end of said tool in spaced relation to the object when the tool reaches the limit of its outward movement.

6. In a pneumatic hammer having a body formed with an air pressure chamber and a plunger for reciprocating in the chamber in response to air pressure exerted against opposite ends thereof, means for supporting a percussion transmitting tool in a position to receive percussive force from said plunger comprising an adapter removably attached to the outer end of said hammer body, a percussion transmitting tool slidably supported in said adapter with its inner end extending into said bore for engagement with said plunger, means for limiting the outward movement of the tool relative to said adapter, a spring for holding the tool in its outward position, means providing an exhaust passage from said pressure chamber to the atmosphere including a ring groove extending round the tool and connecting said ring groove with the pressure chamber, means automatically effective to close said ring groove when the tool is moved inwardly and permitting the exhaust of said pressure in the chamber when the tool goes to its outward limit, a coil spring for urging the tool toward its outer limit, and a spacer element carried by the adapter for engagement with an object to hold the said tool spaced therefrom.

7. In a pneumatic hammer having a body formed with an air pressure chamber and a plunger for reciprocating in the chamber in response to air pressure exerted against opposite ends thereof, means for supporting a percussion transmitting tool in a position to receive percussive force from said plunger comprising an adapter removably attached to the outer end of said hammer body, a percussion transmitting tool slidably supported in said adapter with its inner end extending into said bore for engagement with said plunger, means for limiting the outward movement of the tool relative to said adapter, a spring for holding the tool in its outward position, means providing an exhaust passage from said pressure chamber to the atmosphere including a ring groove extending round the tool and connecting said ring groove with the pressure chamber, means automatically effective to close said ring groove when the tool is moved inwardly and permitting the exhaust of said pressure in the chamber when the tool goes to its outward limit, a coil spring for urging the tool toward its outer limit, and a spacer sleeve adjustably fitted to the adapter and surrounding the tool, a side portion of the said spacer being recessed to permit the side of the tool to be arranged in close relation to an object.

8. In a pneumatic hammer having a body formed with an air pressure chamber in which a plunger is adapted to operate, and having also a central bore communicating with said pressure chamber and for receiving the inner end of a percussion transmitting tool, the mouth of said bore being flared outwardly; means for supporting a percussion transmitting tool in said bore comprising an adapter sleeve secured to the outer end of said body, a percussion transmitting tool slidably supported in a central bore extending through the adapter sleeve, there being an enlarged chamber in the adapter sleeve and the tool being formed with a flange movable lengthwise in said enlarged chamber, an abutment ring slidably mounted on the inner end of said tool and having a reduced end portion shaped to fit the outwardly flared mouth of said central bore of the hammer body, a spring interposed between the flange of said tool and said abutment ring for urging the said tool toward its normal inactive position, there being passages formed in the tool leading from said pressure chamber to the atmosphere when the tool is in its normal inactive position but which passages are closed by inward movement of the tool, and a spacer sleeve surrounding the tool and adjustably clamped to the adapter, whereby the outer end of the spacer may be selectively positioned in any desired spaced relation relative to the outer end of said tool.

9. In apparatus of the character described, the combination of a body member, a percussion transmitting tool for extending from the body to an object on which work is being performed, and means for holding the said body spaced from the work with capacity for rotational movement comprising a sectional spacing element including a fixed section attached to the body and an outer section removably swiveled to the fixed section so that the said body may be rotated relative to the outer section of said spacing member.

CARLYLE B. STAIR.